United States Patent
Buesser et al.

(10) Patent No.: US 11,487,351 B2
(45) Date of Patent: Nov. 1, 2022

(54) INTELLIGENT DIRECTING SYSTEM IN AN INTERNET OF THINGS (IOT) COMPUTING ENVIRONMENT

(71) Applicant: INTERNATIONAL BUSINESS MACHINES CORPORATION, Armonk, NY (US)

(72) Inventors: Beat Buesser, Ashtown (IE); Michele Gazzetti, Dublin (IE); Yiannis Gkoufas, East Road (IE); Kostas Katrinis, Dublin (IE); Vincent Lonij, Dublin (IE); Sean A. McKenna, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1014 days.

(21) Appl. No.: 16/198,940

(22) Filed: Nov. 23, 2018

(65) Prior Publication Data
US 2020/0167695 A1    May 28, 2020

(51) Int. Cl.
| | | |
|---|---|---|
| *G06F 3/01* | (2006.01) | |
| *G06N 5/02* | (2006.01) | |
| *G06T 7/70* | (2017.01) | |
| *G08B 21/02* | (2006.01) | |
| *G09B 21/00* | (2006.01) | |
| *G06T 7/50* | (2017.01) | |
| *G06N 20/00* | (2019.01) | |

(52) U.S. Cl.
CPC .............. *G06F 3/011* (2013.01); *G06N 5/02* (2013.01); *G06N 20/00* (2019.01); *G06T 7/50* (2017.01); *G06T 7/70* (2017.01); *G08B 21/02* (2013.01); *G09B 21/001* (2013.01); *G06T 2207/10028* (2013.01); *G06T 2207/20081* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 9,377,922 B2 | 6/2016 | Work | |
| 9,576,460 B2 * | 2/2017 | Dayal | G08B 21/02 |
| 10,834,562 B1 * | 11/2020 | Zalewski | H02N 11/002 |
| 2013/0243255 A1 * | 9/2013 | Williams | A63F 13/428 |
| | | | 382/103 |
| 2014/0251396 A1 | 9/2014 | Subhashrao et al. | |
| 2017/0220863 A1 * | 8/2017 | Lection | G02B 27/0172 |
| 2018/0157398 A1 * | 6/2018 | Kaehler | G06T 19/006 |
| 2018/0168464 A1 * | 6/2018 | Barnett, Jr. | A61B 5/6861 |
| 2019/0349213 A1 * | 11/2019 | Shive | G05B 15/02 |

FOREIGN PATENT DOCUMENTS

| | | |
|---|---|---|
| CN | 104287947 A | 10/2014 |
| CN | 103735395 B | 2/2016 |
| CN | 206363102 U | 7/2017 |

* cited by examiner

*Primary Examiner* — Edward Martello
(74) *Attorney, Agent, or Firm* — Griffiths & Seaton PLLC

(57) ABSTRACT

Embodiments for an intelligent directing service in an Internet of Things (IoT) computing environment by a processor. One or more objects may be identified within a defined region relative to an entity. At least a portion of an extremity of the entity may be directed to select or avoid the one or more objects according to one or more internet of things (IoT) devices.

20 Claims, 12 Drawing Sheets

INTELLIGENT DIRECTING SYSTEM IN AN INTERNET OF THINGS (IOT) COMPUTING ENVIRONMENT

BACKGROUND OF THE INVENTION

Field of the Invention

The present invention relates in general to computing systems, and more particularly, to various embodiments for an intelligent directing service in an Internet of Things (IoT) computing environment using a computing processor.

Description of the Related Art

In today's society, consumers, business persons, educators, and others use various computing network systems with increasing frequency in a variety of settings. The advent of computers and networking technologies have made possible the increase in the quality of life while enhancing day-to-day activities. Computing systems can include an Internet of Things (IoT), which is the interconnection of computing devices scattered across the globe using the existing Internet infrastructure. IoT devices may be embedded in a variety of physical devices or products.

As great strides and advances in technologies come to fruition, these technological advances can be then brought to bear in everyday life. For example, the vast amount of available data made possible by computing and networking technologies may then assist in improvements to quality of life and appropriate living conditions.

SUMMARY OF THE INVENTION

Various embodiments for implementing an intelligent directing service in an Internet of Things (IoT) computing environment by a processor, are provided. In one embodiment, by way of example only, a method for implementing an intelligent directing service for at least of portion of one or more extremities of an entity in an Internet of Things (IoT) computing environment, again by a processor, is provided. One or more objects may be identified within a defined region relative to an entity. At least a portion of an extremity of the entity may be directed to select or avoid the one or more objects according to one or more internet of things (IoT) devices.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
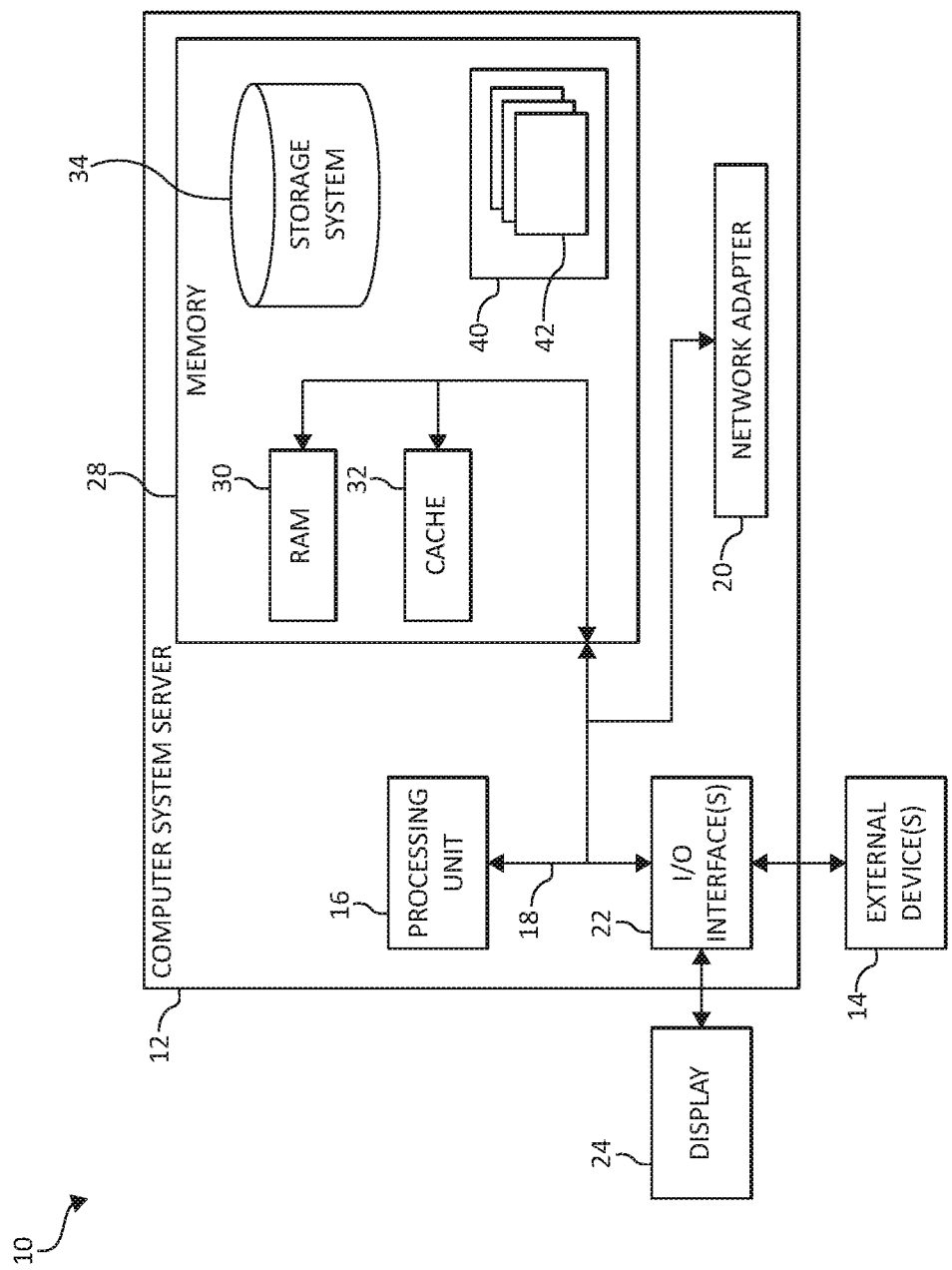
FIG. 1 is a block diagram depicting an exemplary cloud computing node according to an embodiment of the present invention.

As a preliminary matter, computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

The Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Examples of network-enabled appliances or devices may include computers, smartphones, laptops, wearable devices, sensor devices, voice-activated devices, face-activated devices, digital assistants, home appliances, audio systems, televisions, security cameras, security sensors, among countless other examples. Such IoT computing systems may be employed in a variety of settings.

For example, in the course of activities of daily living ("ADL"), picking up and/or avoiding contact with various types of objects is essential such as, for example, selecting a can of soup from a shelf in a supermarket or avoiding contact with a hot boiler plate. However, visually impaired persons often times rely on other persons or devices for assistance. Moreover, some environments themselves, may even limit visibility (e.g., smoke, gases, darkness, etc.) causing any hand motions and/or movements to approach nearby hazards or touch potentially hazardous objects. The portion of the extremity of the entity may include, but not limited to, a portion of a hand, elbow, arm, foot, knee, leg, or a combination thereof.

Accordingly, the present invention provides for an intelligent directing service in an IoT computing environment by a processor. One or more objects may be identified within a defined region relative to an entity. At least a portion of an extremity (e.g., one or both hands) of the entity may be directed to select or avoid the one or more objects according to one or more IoT devices.

In one aspect, the present invention includes a cognitive system that provides an intelligent directing service of at least a portion of an entity towards a target object and warning the entity of potentially hazardous objects. The intelligent directing service includes capturing one or more images, using one or more IoT devices (e.g., wearable egocentric camera) and intelligent directing at least a portion of an extremity of an entity within a selected environment (e.g., a defined area in front, behind, and/or surrounding the entity). The one or more captured images may be analyzed using a machine learning operation to predict coordinates of at least a portion of an extremity of an entity (e.g., one or more hands of a human body). The one or more IoT devices (e.g., wearable egocentric camera) may be used to create a three-dimensional ("3D") virtual image (e.g., a 3D surface) of the environment. The camera pose, and entity location may be estimated in the 3D computing environment. One or more vectors, between the at least a portion of an extremity and the entity, may be determined. The one or more vectors may be used to provide feedback for directing at least a portion of an extremity of the entity via an IoT computing device such as, for example, how to move the portion of the extremity (e.g., one or both hands) of the user via an actuator, and/or to detect and remember potentially hazardous objects, along with issuing a warning upon approaching one or more potentially hazardous objects.

In one aspect, mechanisms of the illustrated embodiments provide for directing at least a portion of an extremity of an entity towards a target object and warning the entity of potentially hazardous objects. The intelligent directing service includes capturing one or more images, using one or more wearable IoT devices, which may include one or more computing devices, cameras, microphones, speakers, databases, operations and connections to one or more cloud services of a cloud computing environment. The intelligent directing service may predict current coordinates (e.g., locations) of the hand(s) relative to the body of an entity by analyzing the current frame or a series of frames of one or more images in a machine learning computing architecture (e.g., deep learning architecture). The captured frames may be from a camera system, in an IoT and/or cloud computing environment. The present invention may create and/or process 3D point-clouds of the IoT and/or cloud computing environment. A location of the camera and/or entity within the 3D point-clouds may be determined and/or derived. The intelligent directing service may recognize potentially hazardous objects, create 3D warning cages around the potentially hazardous objects in the 3D point-cloud, and learn/remember the locations of the potentially hazardous objects by saving the learned knowledge of the potentially hazardous objects in a knowledge domain/database. The intelligent directing service may warn the entity if the entity (e.g., one or more hands of the entity) approaches the warning cages.

In this way, the present invention provides for cognitively directing at least a portion of an extremity directly to a specific object such as, for example, to select the object. The present invention may recognize potentially hazardous objects and/or situations for the at least a portion of an extremity of an entity and/or entity and issue one or more types of warnings. In one aspect, the present invention may be enabled with a single camera system without requirement for any additional sensors or supervision. Furthermore, the present invention may provide cognitive visual sensing or detection as a replacement for those who are visually impaired and/or or augmentation for those requiring improved visual senses (e.g., potentially hazardous workplaces, impaired vision, etc.).

It should be noted as described herein, the term "cognitive" (or "cognition") may be relating to, being, or involving conscious intellectual activity such as, for example, thinking, reasoning, or remembering, that may be performed using a machine learning. In an additional aspect, cognitive or "cognition may be the mental process of knowing, including aspects such as awareness, perception, reasoning and judgment. A machine learning system may use artificial reasoning to interpret data from one or more data sources (e.g., sensor based devices or other computing systems) and learn topics, concepts, and/or processes that may be determined and/or derived by using the machine learning.

In an additional aspect, cognitive or "cognition" may refer to a mental action or process of acquiring knowledge and understanding through thought, experience, and one or more senses using machine learning (which may include using sensor based devices or other computing systems that include audio or video devices). Cognitive may also refer to identifying patterns of behavior, leading to a "learning" of one or more events, operations, or processes. Thus, the cognitive model may, over time, develop semantic labels to apply to observed behavior and use a knowledge domain or ontology to store the learned observed behavior. In one embodiment, the system provides for progressive levels of complexity in what may be learned from the one or more events, operations, or processes.

In additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16 (which may be referred to herein individually and/or collectively as "processor"), a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
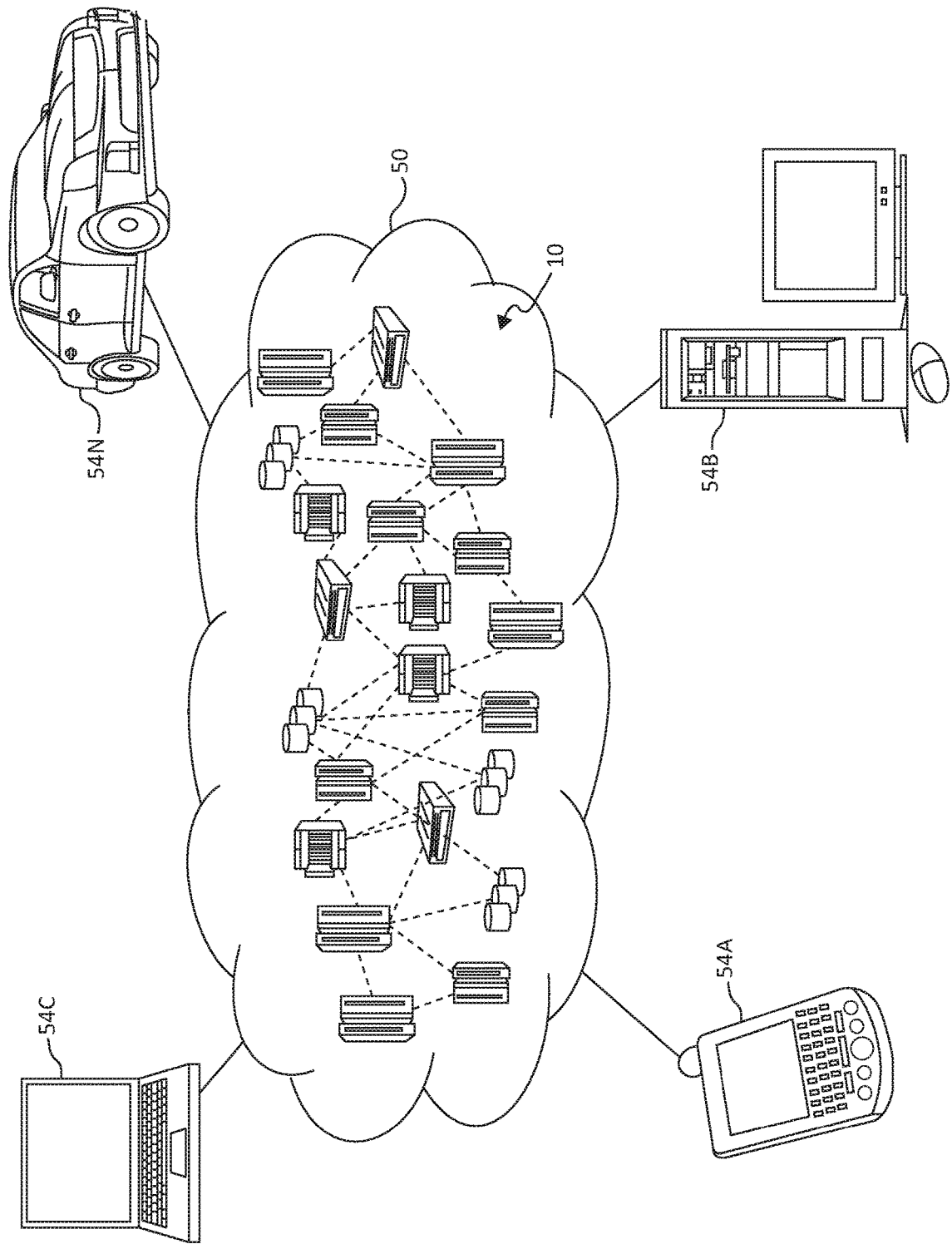
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
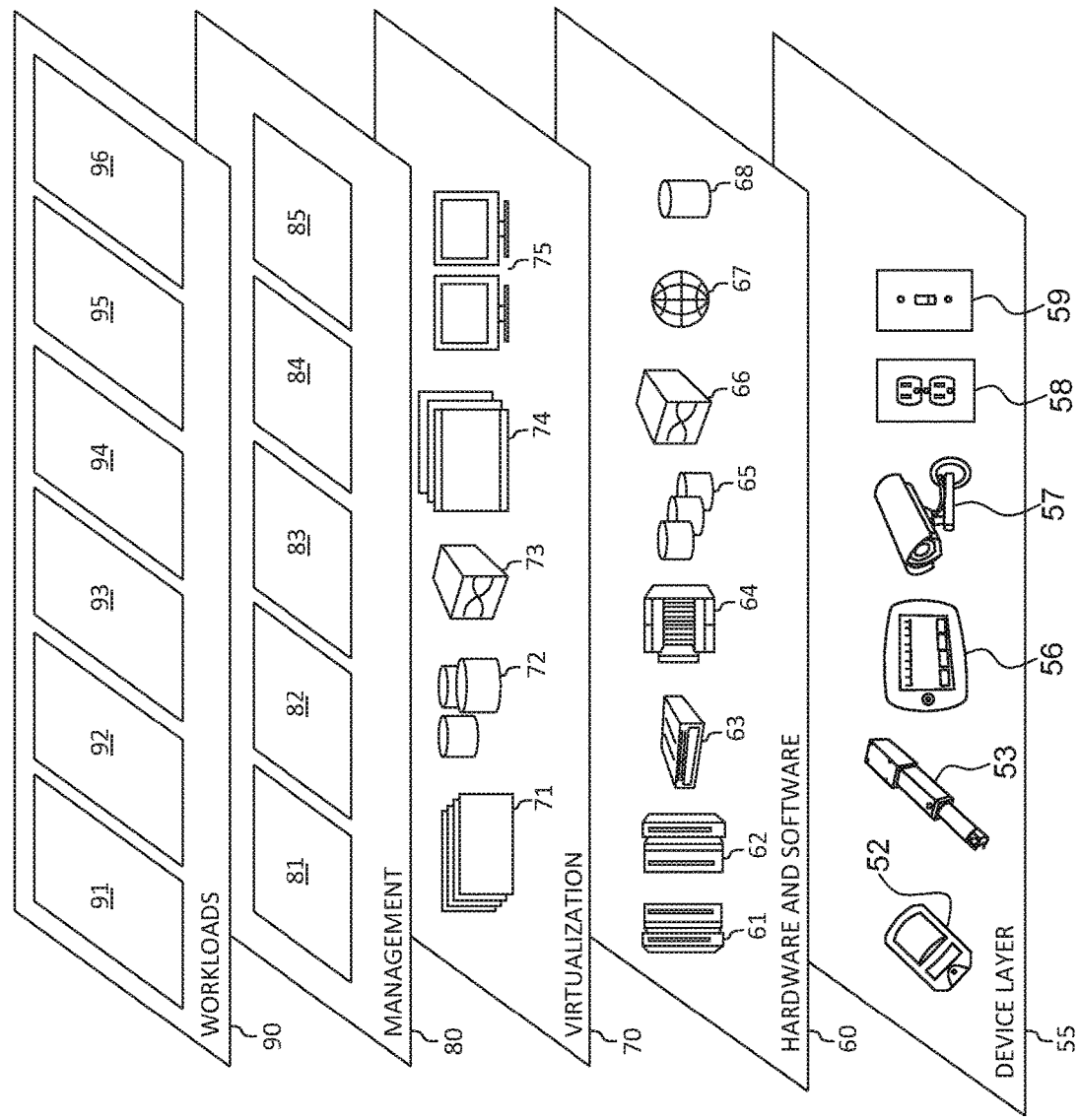
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for an intelligent directing service in an IoT computing environment. In addition, workloads and functions 96 for a intelligent directing service in an IoT computing environment may include such operations as data analysis, machine learning (e.g., artificial intelligence, natural language processing, etc.), user analysis, IoT sensor device detections, operation and/or analysis, as will be further described. One of ordinary skill in the art will appreciate that the workloads and functions 96 for intelligent directing service in an IoT computing environment may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
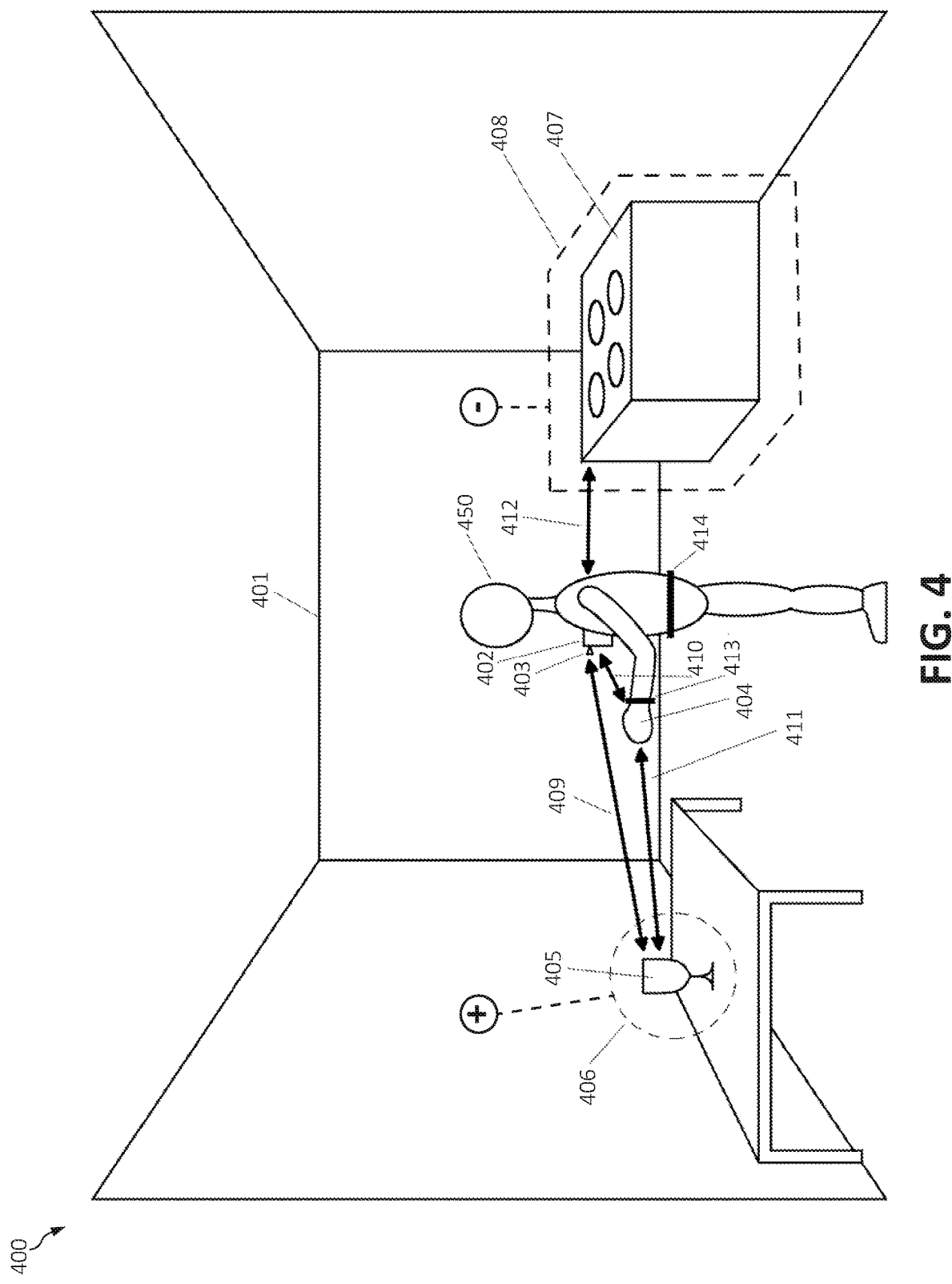
FIG. 4 is an additional block diagram depicting an exemplary functional relationship between various aspects of the present invention.

Turning now to FIG. 4, a block diagram depicting exemplary functional components of system 400 according to various mechanisms of the illustrated embodiments is shown. FIG. 4 illustrates an intelligent directing service using one or more IoT devices (e.g., a wearable device) on an entity (e.g., person or "operator") in a computing environment. One or more features, functionality, components, and/or operations of FIGS. 1-3 may be included in FIG. 4.

The system 400 may include an entity 450, which may be a human for the system 400 to augment and/or replace the vision of the entity 450. Environment 401 is also displayed containing one or more desired objects (shown in FIG. 4 with a positive "+" sign) to select and/or grab and also one or more potentially hazardous objects (e.g., dangers being defined as likely to cause harm, injury, or negatively impact the health state of the entity 450 and shown in FIG. 4 with a negative "−" sign) to avoid contacting (e.g., touching) and/or getting too close such as, for example, within a defined radius or distance from the potentially hazardous objects.

The system 400 may also include one or more computing devices 402. The one or more computing devices 402 may be a central component running computations on a device and controlling all communications with cloud services in a cloud computing environment, as described herein. The one or more computing devices 402 may be an IoT computing device or sensor (e.g., a wearable IoT device such as a smart watch), wireless communication device (e.g., a smartphone), and/or another electronic device that may have one or more processors and memory (e.g., computing devices 54A-N as described in FIG. 2).

Moreover, the system 400 may include, for example, a camera system 403 having one or multiple cameras mounted forward looking on the body of the entity 450 (e.g. chest, head, etc.) or the one or more computing devices 402. The camera system 403 may select and captures frames (e.g., video and/or image frames), continuously and/or on demand, of the field of view including the entity 450, one or more hand(s) 404 of the entity 450 and the environment 401. An object 405 may be an item and/or object desired to be selected, grabbed (e.g., a drinking glass) by guiding the hand(s) 404 of the entity 450 towards the object 405. The system 400 may include and/or provide a warning cage 406, which may be a virtual perimeter around one or more potentially hazardous objects 405 recognized as potentially hazardous such as, for example a glass object 405 that could be accidentally touched and fall of a table depending on the context. The potentially hazardous object 407 may include, for example, a hot stove that is to be avoided from touching or approaching to close within a defined distance.

As an additional example, system 400 may also provide an additional warning cage 408, which may be a virtual perimeter around an additional object recognized as potentially hazardous such as, for example, the potentially hazardous object 407 (e.g., the hot stove) that may be hot and/or may accidentally burn the entity 450. The system 400 may also provide a two dimensional ("2D") or 3D vector A 409 between the entity 450 (and/or computing device 402) and an object such as, for example object 405. The system 400 may also provide a 2D or 3D vector B 410 between the entity 450 (and/or computing device 402) and one or more hands 404.

The system 400 may also determine or calculate a 2D or 3D vector C 411 between hand 404 and object 405 such as, for example, by vector subtraction/addition equivalent to vector C 411 equaling vector B 410 subtracted from vector A 409 (e.g., C=A−B). The system 400 may also provide a 2D or 3D vector D 112 between operator 450 and object 407 and may be corrected for the dimensions of the entity 450 (e.g., chest diameter, etc.).

The system 400 may also include actuator 413, which may be included in one or more computing devices 402 such as, for example, in a bracelet and may produce a vibration, an audio signal, or any combination thereof to return a signal to the entity 450. The signal strength and/or signal characteristics may be proportional to a distance and a direction between hand 404 and target object described by vector C 411 or vector D 412. An actuator 414 may be included in one or more IoT computing devices and also may be worn as a waistband on the entity 450.

Figure 5:
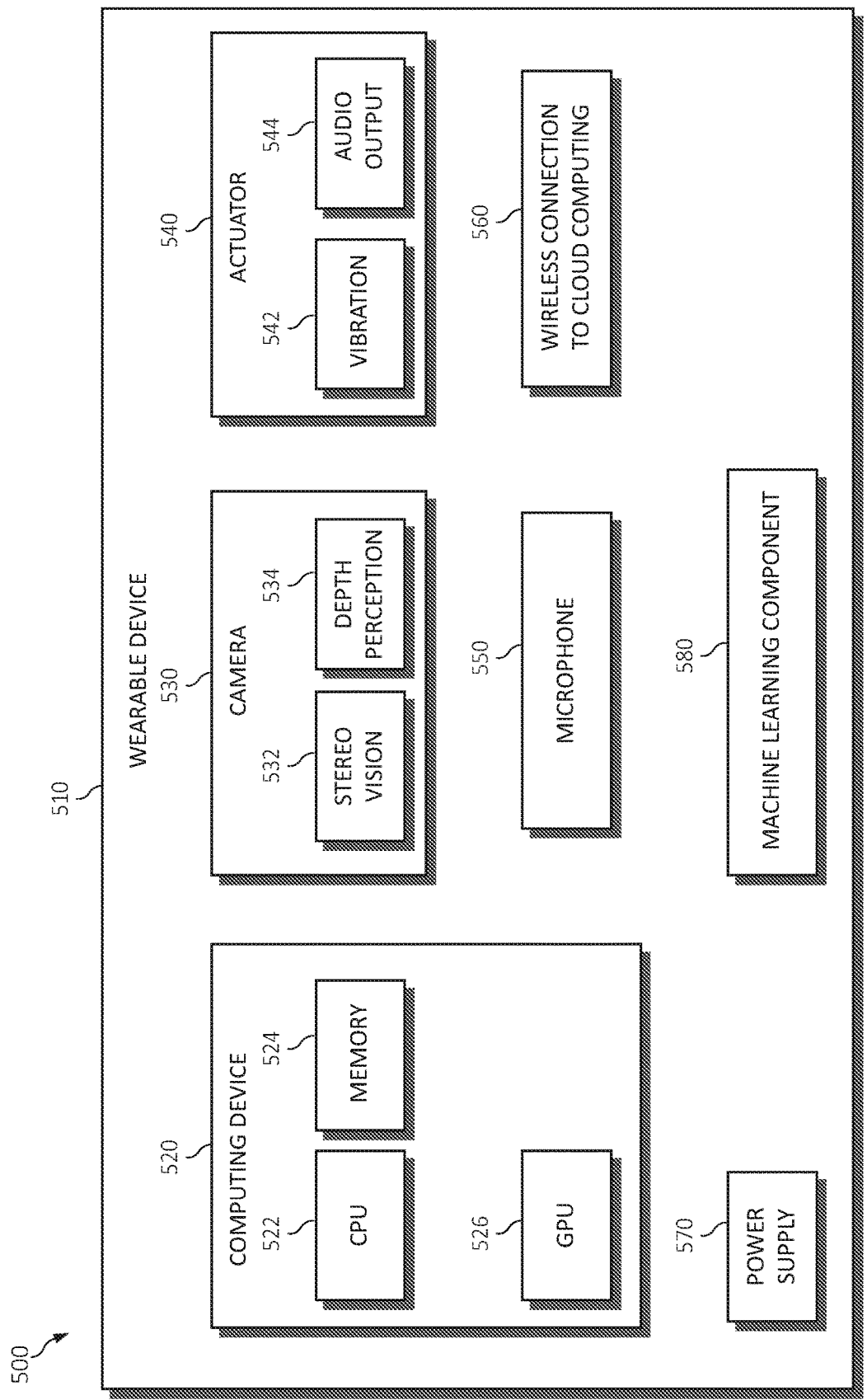
FIG. 5 is an additional block diagram depicting an intelligent directing service in an Internet of Things (IoT) computing environment in which aspects of the present invention may be realized.

Turning now to FIG. 5, a block diagram depicting exemplary functional components of a cognitive guiding system 500 (e.g., a wearable device such as, for example, the computing device 402 of FIG. 4) according to various mechanisms of the illustrated embodiments is shown. One or more features, functionality, components, and/or operations of FIGS. 1-4 may be included in FIG. 5.

FIG. 5 illustrates the cognitive guiding system 500 that may provide a cognitive directing service in a computing environment. That is, cognitive guiding system 500 (e.g., intelligent hand guiding system) may be a computing device that provides various computing components for an intelligent cognitive directing service.

In one aspect, the cognitive guiding system 500 may be included in a computing system that provides virtualized computing services (i.e., virtualized computing, virtualized storage, virtualized networking, etc.). More specifically, the cognitive guiding system 500 may be included in a computing system that provides virtualized computing, virtualized storage, virtualized networking and other virtualized services that are executing on a hardware substrate.

The cognitive guiding system 500 may be a wearable device 510. The wearable device 510 may include a computing device 520, a camera system 530, an actuator 540, a microphone 550, a wireless connection 560 (e.g., wireless connection to a cloud computing system), a power supply 570, and/or a machine learning component 580, each of which may be in association with each other.

The computing device 520 may include a central processing unit ("CPU") 522, a memory 524, and optionally a graphical processing unit 526 ("GPU") for computations and various visual displays (e.g., driver, model evaluation, etc.) on the wearable device 510.

The camera system 530 may include one or more combinations of one or multiple colors (e.g., a red, green, blue "RGB" color model) and/or infrared camera sensors. In one aspect, the camera system 530 may be supported by an infrared laser for increased accuracy. Also, the camera system 530 may also contain one or more cameras in a stereo configuration for stereo vision 532 and depth perception 534 and/or fish-eye lenses for larger fields of view.

The actuator 540 may be used for guiding the hands of the entity such as, for example, moving one or both hands of the user to a desired object, and/or to detect and remember potentially hazardous objects, along with issuing a warning upon approaching one or more potentially hazardous objects. The actuator 540 may provide a vibration 542 and/or audio output 544.

The wireless connection 560 may be included that may connect to cloud services in a cloud computing environment (as described herein) and may allow updating the various applications of the wearable device 510, accessing one or more databases in a cloud computing environment and/or downloading situation specific models, transfer data for computation and model evaluation on a cloud server and receiving back the results, and uploading data for storage. The communication may can be mobile phone (e.g., third generation partnership project (3GPP) long term evolution (LTE), fourth generation ("4G"), fifth generation (5G), 6G, Worldwide interoperability for Microwave Access ("WiMAX"), High Speed Packet Access (HSPA), Bluetooth, and Wi-Fi.

The power supply 570 may be a battery, generator, portable charging device, a power cord, or other device capable of saving and/or delivering a selected amount of electrical charge/power.

The microphone 550 (which may also be and/or include a speaker) may be a recording device for capturing and/or provide one or more sounds. The microphone 550 may include recording voice commands and may be connected to the computing device 520. The microphone 550 may also send one or more audio signals to an entity (e.g., a person wearing the wearable device 510) and connected to the computing device 520.

The machine learning component 580 may assist with cognitively directing at least a portion of an extremity of the entity to select or avoid the one or more objects according to one or more internet of things (IoT) devices. The machine learning component 580 (e.g., via deep learning) may estimate a current position of the hands of the entity in relation to the one or more objects. The machine learning component 580 (e.g., via deep learning) may predict one or more location coordinates of the one or more hands relative to the entity from one or more images using a machine learning operation. Also, the machine learning component 580 (e.g., via deep learning) may identify and learn a location of one or more potentially hazardous objects having a possible negative impact to the entity. The learned knowledge of the machine learning component 580 may include and/or use a database/knowledge store that may include a knowledge domain relating to an entity and/or information about the entities' activities, behaviors, cognitive or health state, and even activities of daily living (ADL), and context of daily living (CDL). The machine learning component 450 may validate and adjust the collected data of a user by observing repeated ADLs, identified objects, potentially hazardous objects, emotion moods, one or more stimuli, atmospheric data, environmental data, physical gestures of one or more user, various types of emotions and stimuli that produces the emptions, speech patterns, facial gestures, facial expressions, biological data, voice inflections and tones, an interactions detected between the user and a service, product, object, and/or devices that may be associated with the wearable device 510.

The machine learning component 580 may also use one or more machine learning operations such as, for example, an instance of IBM® Watson® such as Watson® Analytics (IBM® and Watson® are trademarks of International Business Machines Corporation). That is, cognitive reasoning, analytics and/or artificial intelligence (AI) may be used to recognize intent, understand a meaning of the user, search known information about the intended user (e.g., occupants of a structure) and/or use historical data about a user or group of users.

In one aspect, the machine learning component 580 may include machine learning modeling and/or operations that may be performed using a wide variety of methods or combinations of methods, such as supervised learning (e.g., MCMC filters, Kalman filters, particle filters, etc.), unsupervised learning, temporal difference learning, reinforcement learning and so forth. That is, the machine learning modeling may learn parameters of one or more physical models. The machine learning modeling may be employed in the category of parameter estimation of state-space models, which may be completed by unsupervised learning techniques, particularly to learn the context and/or the indicators. Some non-limiting examples of supervised learning which may be used with the present technology include Kalman filters, particle filters, MCM filters, AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are within the scope of this disclosure.

Figure 6:
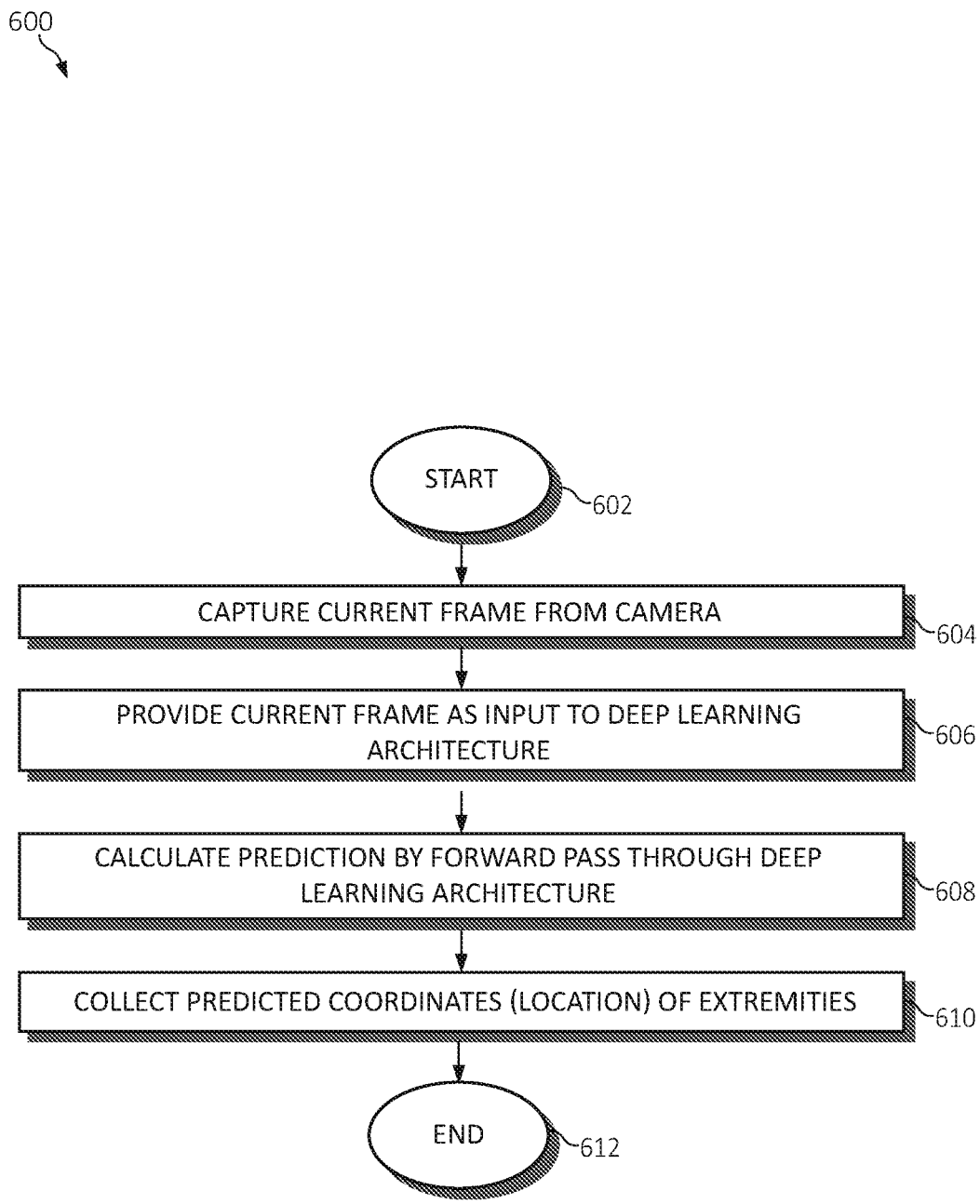
FIG. 6 is a flowchart diagram depicting an additional exemplary method for estimating hand coordinates in which aspects of the present invention may be realized.

Turning now to FIG. 6, a method 600 for estimating hand coordinates in an Internet of Things (IoT) computing environment is depicted, in which various aspects of the illustrated embodiments may be implemented. The functionality 600 may be implemented as a method executed as instructions on a machine, where the instructions are included on at least one computer readable medium or on a non-transitory machine-readable storage medium. The functionality 600 may start in block 602.

One or more current frames may be captured from a camera, as in block 604. The current frame may be provided as input into a deep learning architecture (e.g., machine learning computing architecture), as in block 606. A prediction may be determined (e.g., calculated) by a forward pass operation in the deep learning architecture (e.g., machine learning computing architecture), as in block 608. A forward pass in a deep learning model may be equivalent to an inference of the model or a prediction made using the model. The forward pass refers to obtaining the output of the model for a certain input. One or more predicted coordinates (e.g., location) of extremities of an entity (e.g., at least a portion of extremities such as one or both hands) may be collected, as in block 610. The portion of the extremity of the entity may include, but not limited to, a portion of a hand, elbow, arm, foot, knee, leg, or a combination thereof. The functionality 600 may end in block 612.

The deep learning architecture (e.g., the machine learning computing architecture) may include one or more combinations of multiple deep learning models (e.g., neural networks, convolutional neural networks, recurrent networks, etc.). Deep learning models may include one or multiple hidden layers between an input, which is the frame and/or combination of multiple frames captured by the camera, and the output representing one more target values, for example coordinates in 3 dimensions. The deep learning architecture (e.g., machine learning computing architecture) can be evaluated on the CPU or GPU (as described in FIG. 5). The hand detection operation may include using a deep learning architecture that has been trained to predict the coordinates (location) of one or both hands relative to the camera in 2D or 3D as shown as vector B (410) in FIG. 4.

Figure 7:
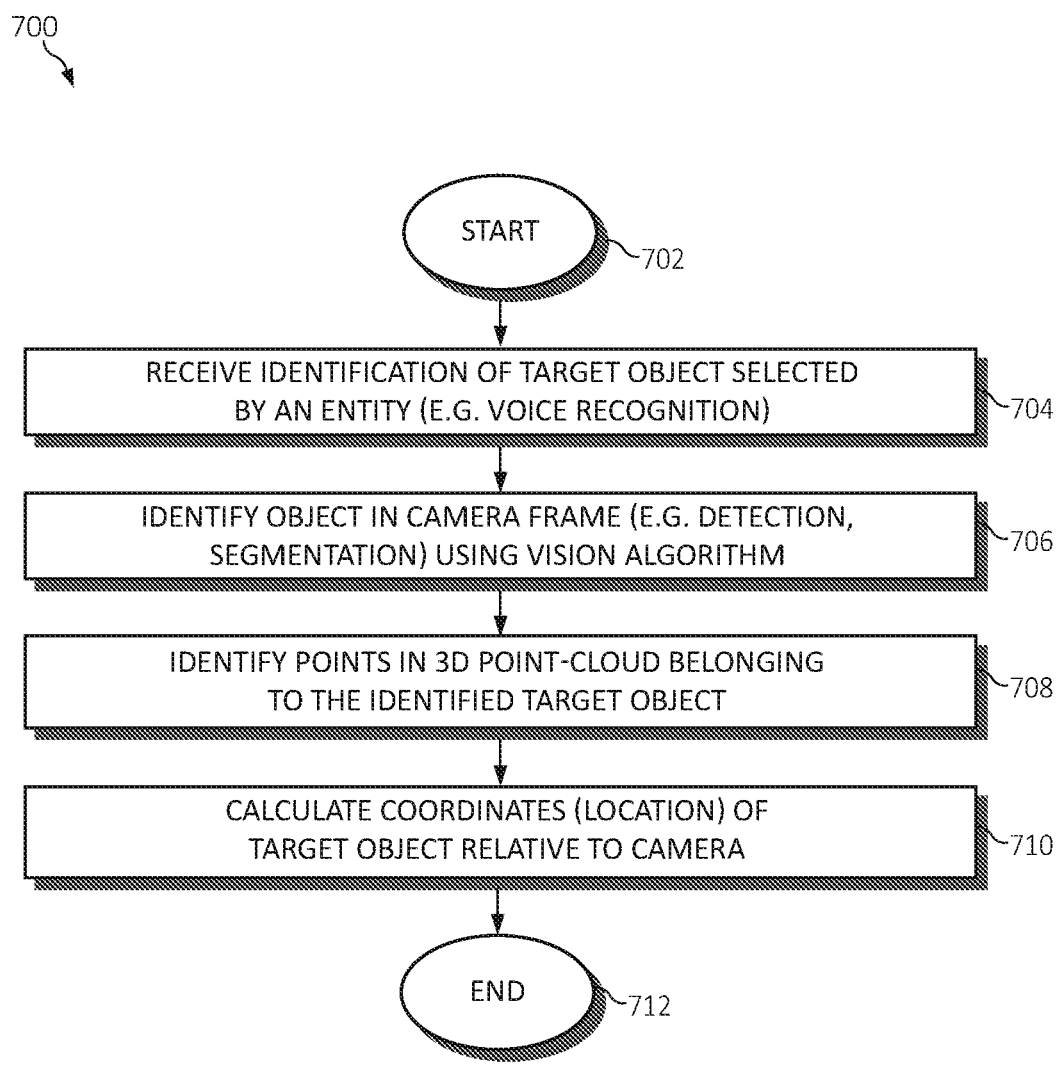
FIG. 7 is a flowchart diagram depicting an additional exemplary method for identifying a target object in a three-dimensional ("3D") point cloud in which aspects of the present invention may be realized.

FIG. 7 is a flowchart diagram depicting an additional exemplary method for identifying a target object in a three-dimensional ("3D") point cloud. The functionality 700 may be implemented as a method executed as instructions on a machine, where the instructions are included on at least one computer readable medium or on a non-transitory machine-readable storage medium. The functionality 700 may start in block 702.

An identification ("ID") of a target object selected by an entity/operator (e.g., voice recognition) may be received, as in block 704. An object in a camera frame may be identified using a vision operation (e.g., detection, segmentation, vision algorithm, etc.), as in block 706. One or more points may be identified in 3D point-cloud belonging to the identified object, as in block 708. One or more coordinates (e.g., location) of a target object relative to the camera may be determined (e.g., calculated), as in block 710. The functionality 700 may end in block 712.

The point-cloud may be a collection of points in 3D space corresponding to one or more features recognized by a camera in the 3D environment 401 of FIG. 4. Point-cloud data can also be stored as a mesh, grid, graph, network, etc. A vision operation may be used for detecting a predefined object in the frame using the deep learning architecture based on current and/or past frames. The vision operation detects the points in the point-cloud belonging to an identified target object and associates the points with the object. In one aspect, one or more objects in color frames may be identified and the detected object may be overlaid over the point-cloud frames to collect the points belonging to the object. The vision operation calculates the coordinates of the object's points relative to the camera to determine vector A (409) in FIG. 4. The camera's position and orientation, within the point-cloud, and therefore the environment, is determined using simultaneous localization and mapping (SLAM) algorithms for the computational problem of constructing or updating maps of points of the environment as described in FIG. 4.

Figure 8:
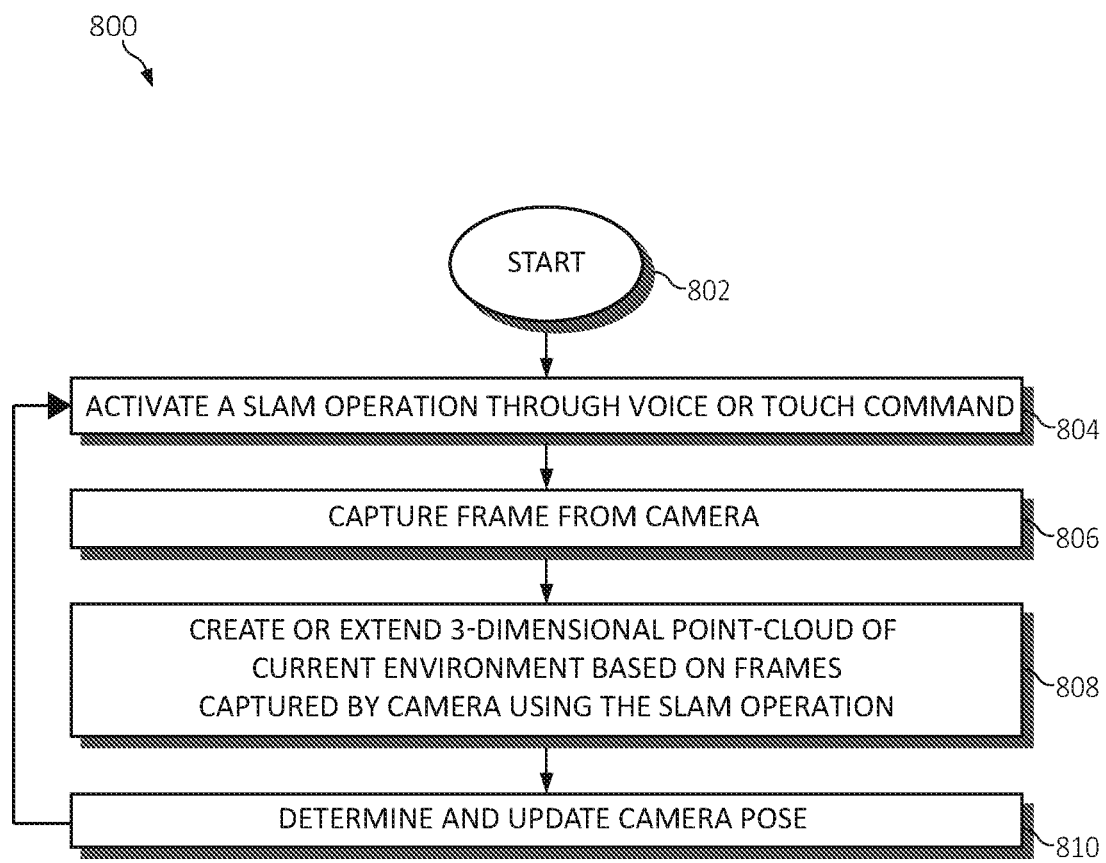
FIG. 8 is a flowchart diagram depicting an additional exemplary method for estimating a camera pose in an unknown environment in which aspects of the present invention may be realized.

FIG. 8 is a flowchart diagram depicting an additional exemplary method for estimating a camera pose in an unknown environment. The functionality 800 may be implemented as a method executed as instructions on a machine, where the instructions are included on at least one computer readable medium or on a non-transitory machine-readable storage medium. The functionality 800 may start in block 802.

One or more active Simultaneous Localization and Mapping ("SLAM") operations may be activated via a voice or couch command, as in block 804. A frame shot may be captured from an area, as in block 806. A 3D point-cloud may be created or extended of a current environment based on frames captured by a camera using the SLAM operation, as in block 808. A camera pose may be determined and/or updated, as in block 810. The functionality 800 may return to block 810.

The SLAM operation may be able to combine frames and/or depth perception images into a 3D point-cloud or equivalents. A SLAM operation may be able to estimate the camera pose (e.g., position and orientation) within the 3D point-cloud. Because the camera is worn on the body of the entity, the camera pose allows estimating the operator position (e.g., or at least a portion of one or more extremities of the entity) within the point-cloud and determine vectors A (409) and D (412) in FIG. 4.

Unknown environments and associated point-clouds and metadata may be environments that the entity has not previously seen and/or has not stored the point-clouds in memory and/or a database after previous visits, which are not available for download from a cloud service or might have changed considerably since the last visit. In this case the wearable device creates a new point-cloud of this unknown environment. A wearable device allows for storing new point-clouds on the IoT computing device and/or in a cloud computing system for later use and/or sharing with other wearable devices/operators.

Figure 9:
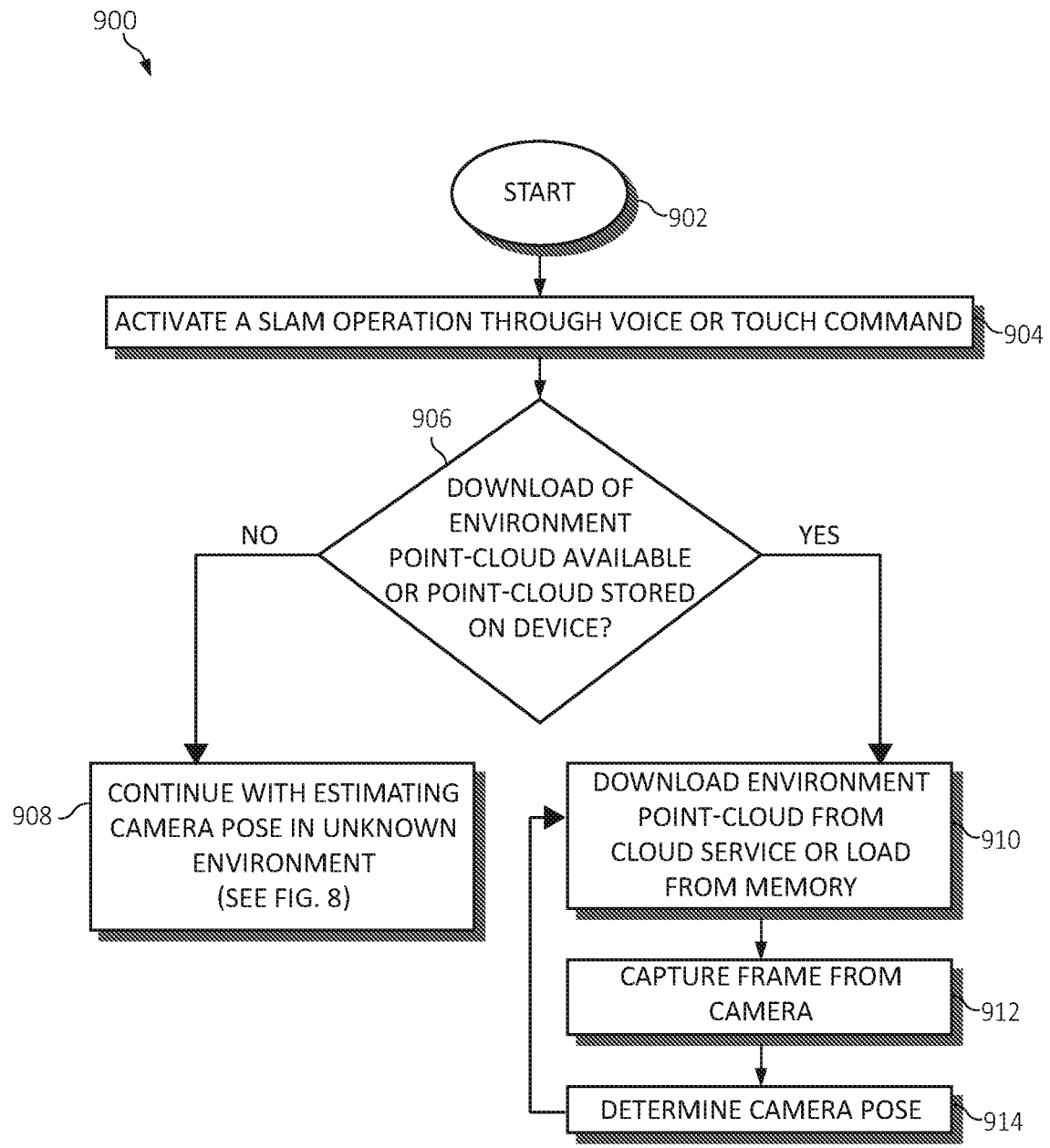
FIG. 9 is a flowchart diagram depicting an additional exemplary method for estimating a camera pose in a known environment in which aspects of the present invention may be realized.

FIG. 9 is a flowchart diagram depicting an additional exemplary method for estimating a camera pose in a known environment. The functionality 900 may be implemented as a method executed as instructions on a machine, where the instructions are included on at least one computer readable medium or on a non-transitory machine-readable storage medium. The functionality 900 may start in block 902.

A SLAM operation may be activated via voice command and/or touch command, as in block 904. A determination may be performed to determine if a download of an environment of point-clouds (e.g., 3D point-clouds) is available and/or stored on an IoT computing device, as in block 906. If no from block 906, a camera pose may be estimated in an unknown computing environment, as in block 908. If yes from block 906, the environment of point-clouds may be downloaded from a cloud computing service and/or loaded from memory, as in block 910. The camera may capture a frame, as in block 912. The camera may capture a frame, as in block 914. The functionality 900 may return to block 910.

In one aspect, the known environment may be included in an environment that has been previously be a safe environment. The point-cloud data of the environment, about the current environment, can be loaded from device memory or downloaded from cloud service. Also, additional locations (e.g., restaurants, museums, conference centers, shopping malls, etc.) can provide detailed point-clouds of their premises as a free service or subscription service to their visitors that are available for download at an entrance to the locations and/or through cloud computing services.

Figure 10:
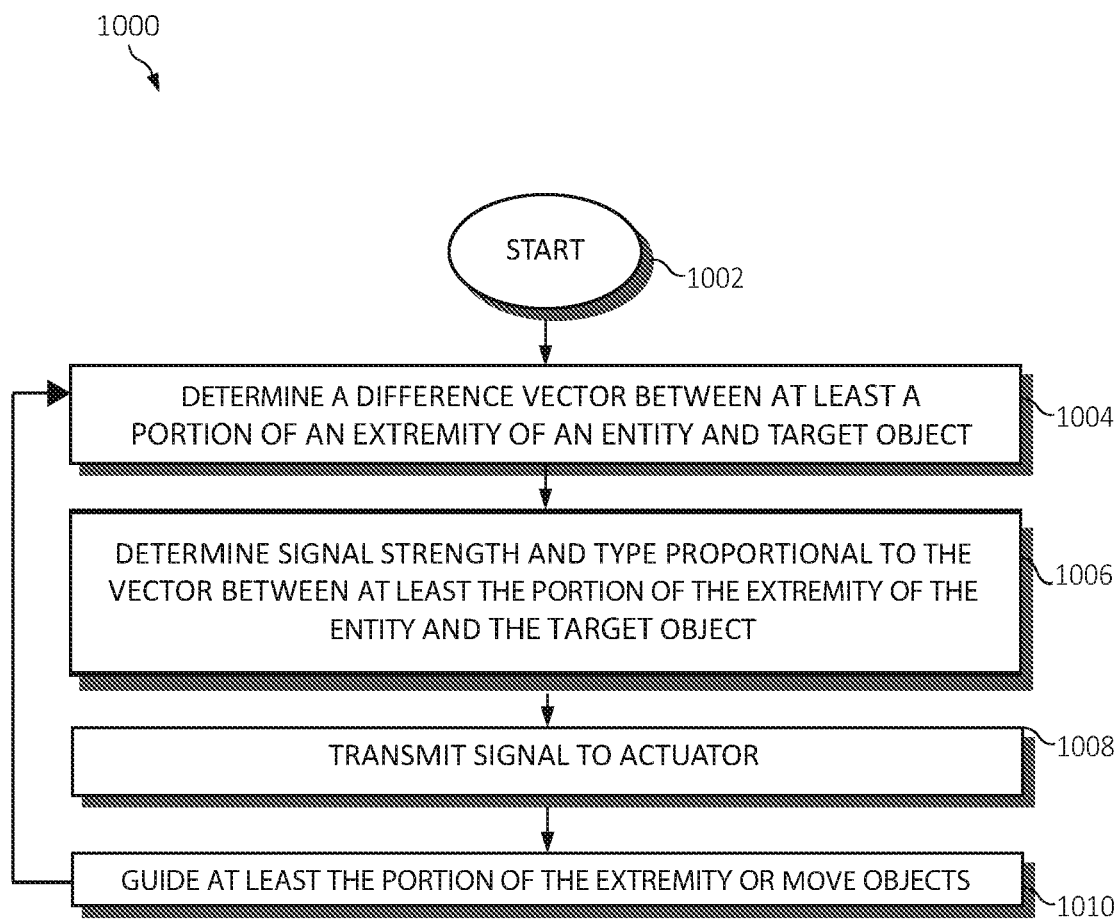
FIG. 10 is a flowchart diagram depicting an additional exemplary method for a implementing an intelligent directing service in an unknown environment in which aspects of the present invention may be realized.

FIG. 10 is a flowchart diagram depicting an additional exemplary method 1000 for implementing an intelligent directing service in an unknown environment. The functionality 1000 may be implemented as a method executed as instructions on a machine, where the instructions are included on at least one computer readable medium or on a non-transitory machine-readable storage medium. The functionality 1000 may start in block 1002.

A difference a vector between at least a portion of an extremity of an entity (e.g., one or both hands) and a target object may be determined and/or calculated, as in block 1004. A signal strength and type may be determined proportional to the difference vector between at least the portion of the extremity (e.g., one or both hands) of an entity and object, as in block 1006. The signal may be transmitted to an actuator, as in block 1008. At least a portion of the extremity (e.g., one or both hands) or the target object may be moved using an intelligent directing service operation, as in block 1010. The functionality 1000 may return to block 1004.

In one aspect, the intelligent directing service operation may be a service for guiding one or both hands of the operator towards a specified target object. The intelligent directing service operation may be activated and deactivated by the entity on command or demand. The intelligent directing service operation may also determine the vector C 411 from FIG. 4 between a hand and a target object as the difference between target object coordinates (e.g., location) defined by vector A 409 from FIG. 4 and the coordinates (location) of the hand(s) defined by vector B 410 from FIG. 4.

In one aspect, vector C may be determined and/or calculated by vector subtraction (e.g., "C=A−B") but other mathematical operations can be equivalent. A computing device transforms the distance (length of vector C 411 of FIG. 4) and direction between the hand and the target object into a signal and returns it to the operator through the actuator to close the control loop. For example, the signal may increase in strength for decreasing length of vector C 411 from FIG. 4. If the characteristics of vector C 411 from FIG. 4 are changed, interval lengths may be proportional to vector angles (e.g., polar, azimuth, or combination thereof). A signal returned to the operator could be vibrations and/or audio output through speakers on the actuator or the wearable device.

Figure 11:
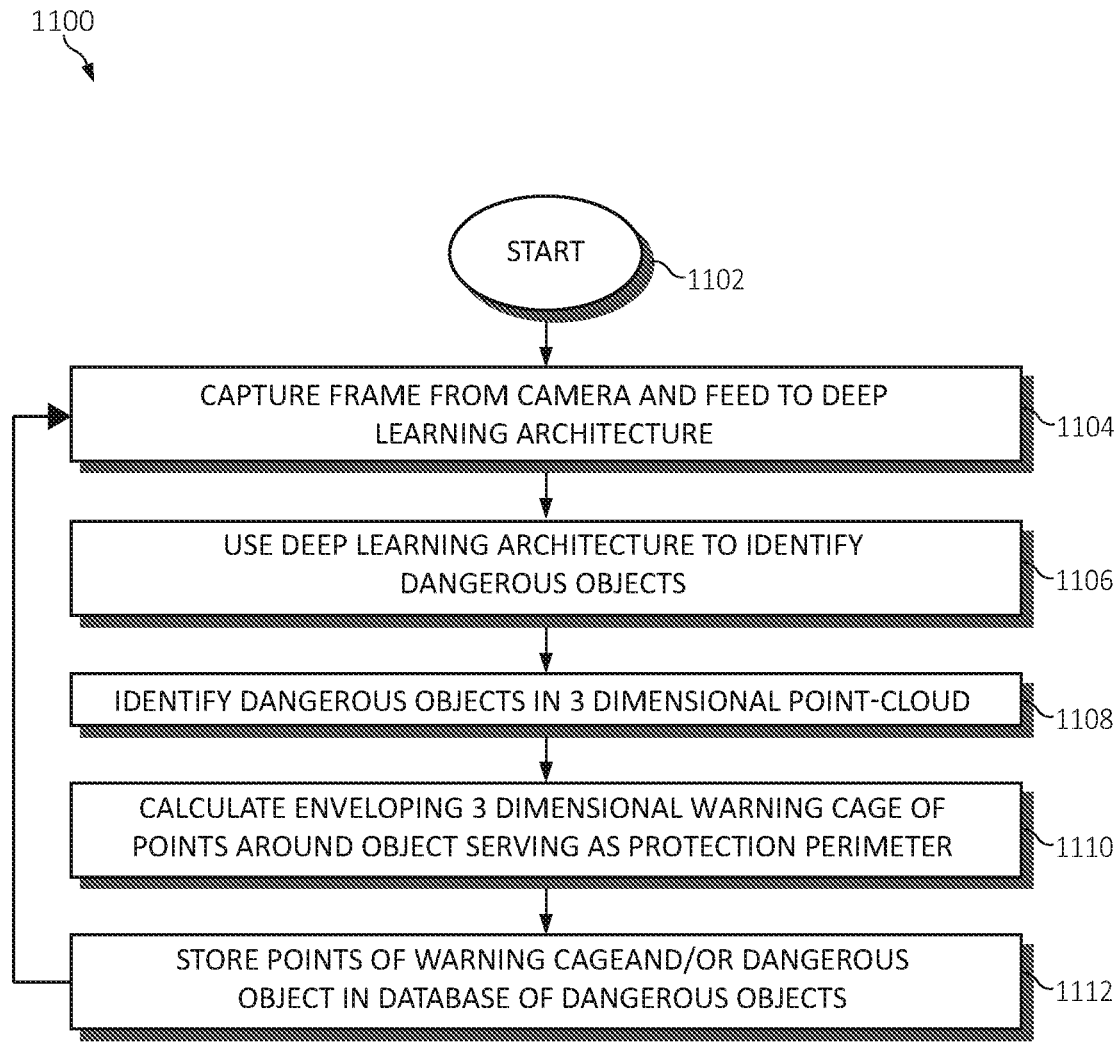
FIG. 11 is a flowchart diagram depicting an additional exemplary method for recognizing and remembering potentially hazardous objects in which aspects of the present invention may be realized.

FIG. 11 is a flowchart diagram depicting an additional exemplary method for recognizing and remembering potentially hazardous objects. The functionality 1100 may be implemented as a method executed as instructions on a machine, where the instructions are included on at least one computer readable medium or on a non-transitory machine-readable storage medium. The functionality 1100 may start in block 1102.

A camera frame (e.g., image) may be captured from a camera and provided (e.g., "feed") to a deep learning computing architecture, as in block 1104. The deep learning computing architecture may be used to identify one or more potentially hazardous objects, as in block 1106. The one or more potentially hazardous objects may be identified in a 3D point-cloud, as in block 1108. An enveloping 3D warning cage of points around an object serving as a protection perimeter may be determined and/or calculated, as in block 1110. The 3D point-cloud of the warning cage and/or potentially hazardous object may be stored in a database (e.g., knowledge domain or "database of potentially hazardous objects"), as in block 1112. The functionality 1100 may return to block 1104.

In one aspect, a potentially hazardous object recognition operation employs a vision operation to identify one or more potentially hazardous objects. The potentially hazardous objects may be objects that may injure, negatively impact the health state of the entity, objects that the operator does not want to touch because they could get damaged, etc. In short, the potentially hazardous objects are all objects that the entity does not want to touch, bump, and/or accidently contact. In one aspect, the potentially hazardous objects may even be a selected region, area, or locations (e.g., a construction zone such as, for example, a "wet paint" sign on walls or stairs the entity may not want to touch). The employed vision operation may use a deep learning architecture that recognizes general classes of objects (e.g., potentially hazardous and not potentially hazardous) and compare the predicted objects with a predefined list of object types classified as potentially hazardous and/or use a deep learning architecture that was specifically trained on recognizing only potentially hazardous objects.

The database of potentially hazardous objects is a database which contains point locations and metadata of recognized warning cages. The potentially hazardous object recognition operation remembers the location of potentially hazardous objects in the point-cloud and stores the potentially hazardous objects along with the point-cloud in a database. The potentially hazardous objects may also define a warning cage of points in the point-cloud around the potentially hazardous object and stores them along with the point-cloud in a database.

Figure 12:
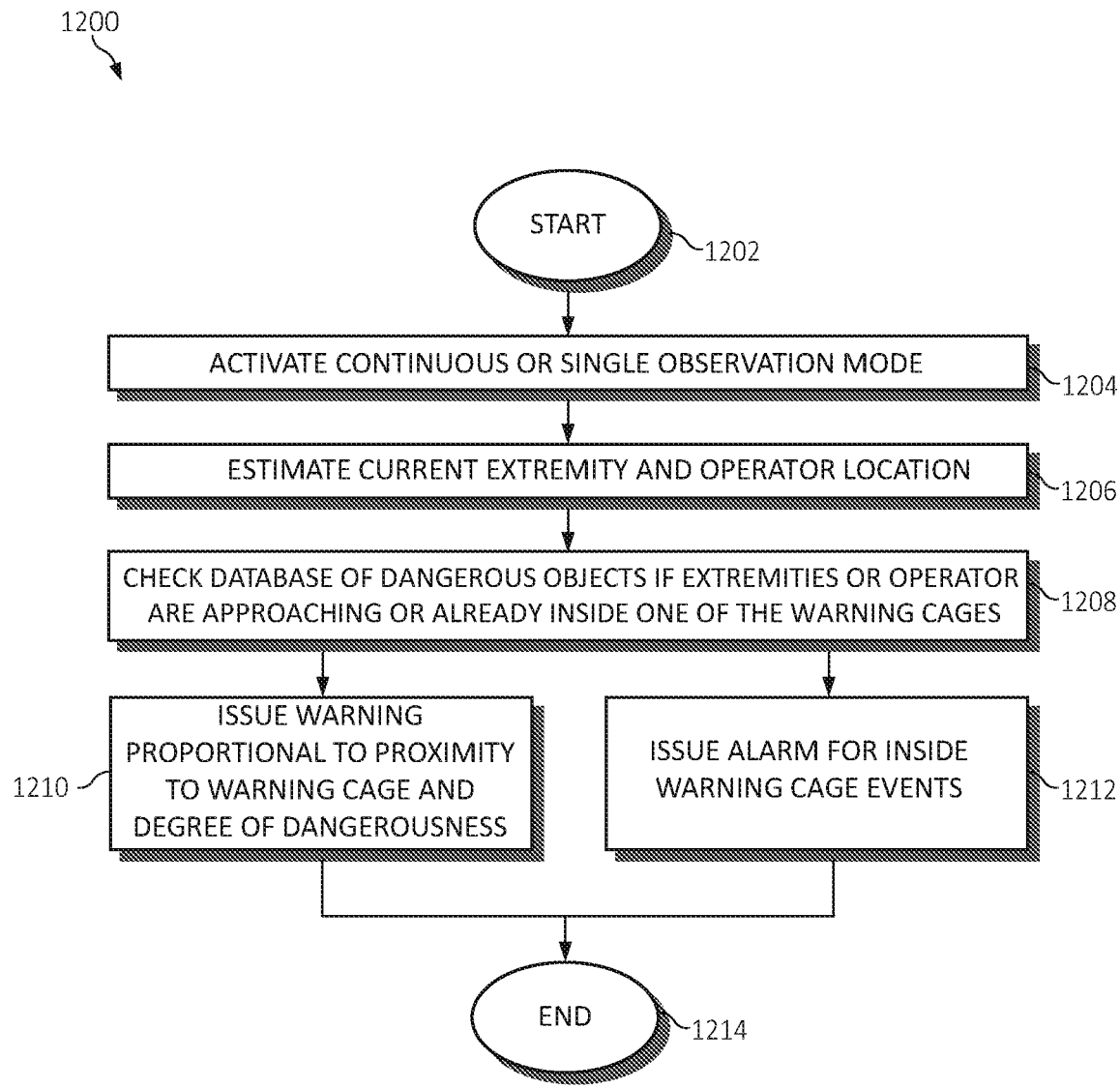
FIG. 12 is a flowchart diagram depicting an additional exemplary method for implementing an intelligent directing service in an unknown environment in which aspects of the present invention may be realized.

FIG. 12 is a flowchart diagram depicting an additional exemplary method for implementing an intelligent directing service in an unknown environment. The functionality 1200 may be implemented as a method executed as instructions on a machine, where the instructions are included on at least one computer readable medium or on a non-transitory machine-readable storage medium. The functionality 1200 may start in block 1202.

A continuous and/or single observation mode may be activated, as in block 1204. A current hand and entity (e.g., operator) may be estimated, as in block 1206. A database of potentially hazardous objects may be analyzed and/or checked to determine if at least a portion of one or more extremities of an entity (e.g., one or more hands) and/or entity are approaching or already inside one of the warning cages, as in block 1208. From block 1208, a warning may be issued proportional to proximity to a warning cage and a degree of potentially hazardousness (e.g., increasing the alarm sound as a portion of an extremity of an entity (e.g., one or more hands) approach the warning cage or decreasing the alarm sound as a portion of the extremity of the entity (e.g., one or more hands) moves away from the warning cage), as in block 1210. From block 1208, one or more alarms may be issued for inside warning cage events, in block 1212. The functionality 1200 may end in block 1214.

The warning operation detects if at least a portion of an extremity of an entity (e.g., one or more hands or body of the operator) are approaching potentially hazardous objects by comparing the current location of at least a portion of the extremity of the entity or body with the locations of the warning cages. Alternatively, the warning operation may also calculate the vector C 411 of FIG. 4, the vector 412 of FIG. 4 between the portion of the extremity and object for all potentially hazardous objects. The warning operation checks if at least a portion of the extremity of the entity (e.g., one or both of the hands and/or the body) are approaching and/or entering one of the warning cages. The warning operation checks if the vector length (distance) between a portion of the extremity of the entity (e.g., hand(s) or body) and one of the potentially hazardous objects gets smaller than predefined minimum value. The warning operation issues warnings through actuators and/or speakers if hand(s) or body are approaching a potentially hazardous object or enter a warning cage. A single mode analyzes a current frame with the warning operation upon command from the entity and/or computing device. The warning operation continuous mode analyzes a continuous feed of frames with the warning algorithm until it is turned off.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, by a processor, for implementing an intelligent directing service in a computing environment, comprising:
    identifying one or more objects within a defined region relative to an entity; and
    directing at least a portion of an extremity of the entity to select a first object of the one or more objects while directing the at least the portion of the extremity to avoid a second object of the one or more objects according to an analyzation of the one or more objects by one or more Internet of things (IoT) devices worn by the entity.

2. The method of claim 1, further including estimating a current position of at least the portion of the extremity of the entity in relation to the one or more objects according to a machine learning operation.

3. The method of claim 1, further including predicting location coordinates of at least the portion of the extremity relative to the entity from one or more images using a machine learning operation.

4. The method of claim 1, further including:
    determining both a distance and a direction of a vector between at least the portion of the extremity of the entity and the one or more objects; and
    transforming the vector into a signal for use in an actuator.

5. The method of claim 1, further including creating a three-dimensional (3D) point cloud of an environment of the one or more objects and the entity using the one or more IoT device, wherein the one or more IoT devices include at least camera.

6. The method of claim 1, further including identifying and learning a location of one or more potentially hazardous objects having a possible negative impact to the entity.

7. The method of claim 1, further including:
    creating a three-dimensional (3D) warning perimeter in a virtual computing environment around one or more identified potentially hazardous objects; and
    alerting the entity of the one or more potentially hazardous objects according to at least the portion of the extremity of the entity within a selected proximity of the 3D warning perimeter.

8. A system for implementing an intelligent directing service in an Internet of Things (IoT) computing environment, comprising:
    one or more computers with executable instructions that when executed cause the system to:
    identify one or more objects within a defined region relative to an entity; and
    direct at least a portion of an extremity of the entity to select a first object of the one or more objects while directing the at least the portion of the extremity to avoid a second object of the one or more objects according to an analyzation of the one or more objects by one or more Internet of things (IoT) devices worn by the entity.

9. The system of claim 8, wherein the executable instructions further estimate a current position of at least the portion of the extremity of the entity in relation to the one or more objects according to a machine learning operation.

10. The system of claim 8, wherein the executable instructions further predict location coordinates of at least the portion of the extremity relative to the entity from one or more images using a machine learning operation.

11. The system of claim 8, wherein the executable instructions further:
   determine both a distance and a direction of a vector between at least the portion of the extremity of the entity and the one or more objects; and
   transform the vector into a signal for use in an actuator.

12. The system of claim 8, wherein the executable instructions further create a three-dimensional (3D) point cloud of an environment of the one or more objects and the entity using the one or more IoT device, wherein the one or more IoT devices include at least camera.

13. The system of claim 8, wherein the executable instructions further identify and learn a location of one or more potentially hazardous objects having a possible negative impact to the entity.

14. The system of claim 8, wherein the executable instructions further:
   create a three-dimensional (3D) warning perimeter in a virtual computing environment around one or more identified potentially hazardous objects; and
   alert the entity of the one or more potentially hazardous objects according at least the portion of the extremity of the entity within a selected proximity of the 3D warning perimeter.

15. A computer program product for implementing an intelligent directing service by a processor, the computer program product comprising a non-transitory computer-readable storage medium having computer-readable program code portions stored therein, the computer-readable program code portions comprising:
   an executable portion that identifies one or more objects within a defined region relative to an entity; and
   an executable portion that directs at least a portion of an extremity of the entity to select a first object of the one or more objects while directing the at least the portion of the extremity to avoid a second object of the one or more objects according to an analyzation of the one or more objects by one or more Internet of things (IoT) devices worn by the entity.

16. The computer program product of claim 15, further including an executable portion that estimates a current position of at least the portion of the extremity of the entity in relation to the one or more objects according to a machine learning operation.

17. The computer program product of claim 15, further including an executable portion that predicts location coordinates of at least the portion of the extremity relative to the entity from one or more images using a machine learning operation.

18. The computer program product of claim 15, further including an executable portion that:
   determines both a distance and a direction of a vector between at least the portion of the extremity of the entity and the one or more objects; and
   transforms the vector into a signal for use in an actuator.

19. The computer program product of claim 15, further including an executable portion that creates a three-dimensional (3D) point cloud of an environment of the one or more objects and the entity using the one or more IoT device, wherein the one or more IoT devices include at least camera.

20. The computer program product of claim 15, further including an executable portion that:
   identifies and learns a location of one or more potentially hazardous objects having a possible negative impact to the entity;
   creates a three-dimensional (3D) warning perimeter in a virtual computing environment around the one or more identified potentially hazardous objects; and
   alerts the entity of the one or more potentially hazardous objects according to at least the portion of the extremity of the entity within a selected proximity of the 3D warning perimeter.

* * * * *